H. V. R. READ.
DEVICE FOR AERATING LIQUIDS.
APPLICATION FILED JULY 1, 1912.
1,056,451.
Patented Mar. 18, 1913.
4 SHEETS—SHEET 2.
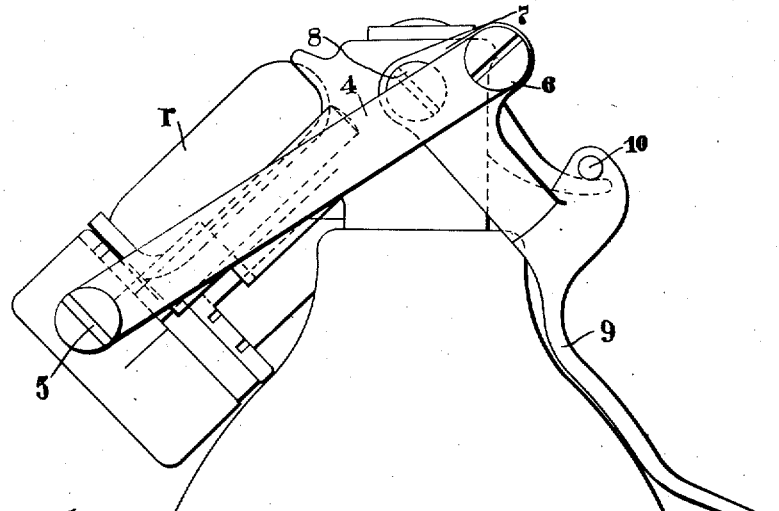
Fig. 2.
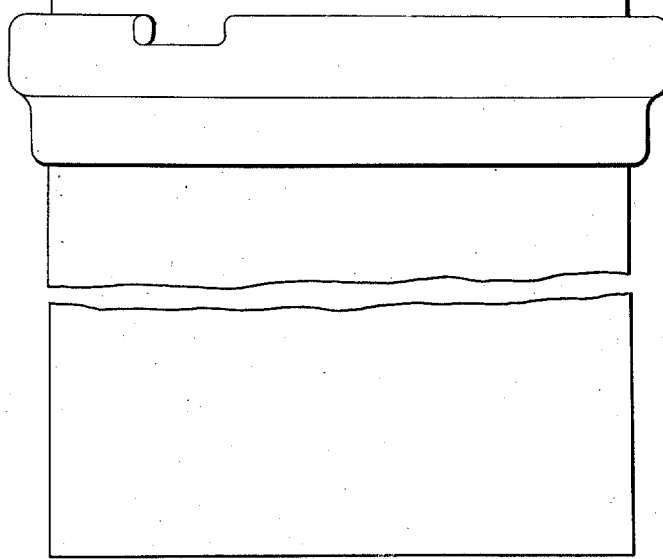
Witnesses.
Cornelius Zabriskie
M. C. Rodriguez
Inventor.
Harry V. R. Read.
By Griffin Bernhard
Attorneys.

H. V. R. READ.
DEVICE FOR AERATING LIQUIDS.
APPLICATION FILED JULY 1, 1912.

1,056,451.

Patented Mar. 18, 1913.
4 SHEETS—SHEET 3.

Witnesses.
Cornelius Zabriskie
M. C. Rodriguez

Inventor.
Harry V. R. Read.
By Griffin Bernhard
Attorneys.

H. V. R. READ.
DEVICE FOR AERATING LIQUIDS.
APPLICATION FILED JULY 1, 1912.
1,056,451.
Patented Mar. 18, 1913.
4 SHEETS—SHEET 4.
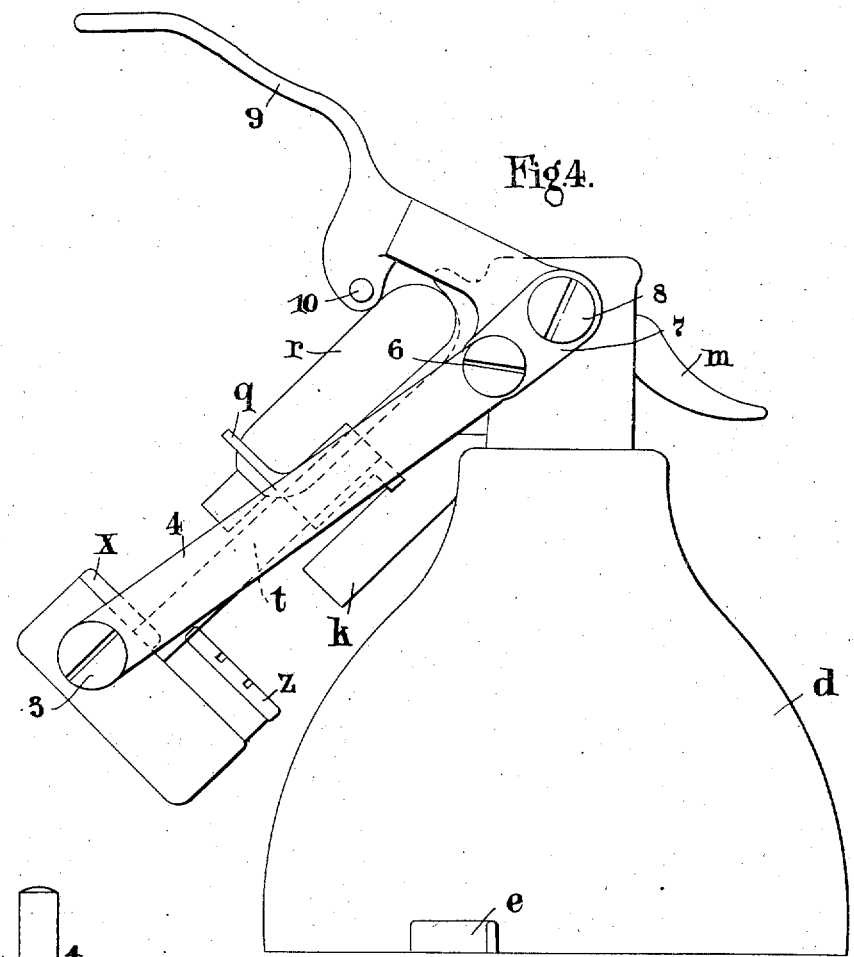
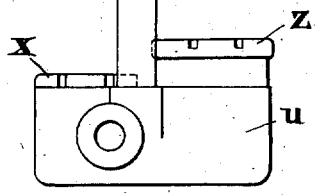
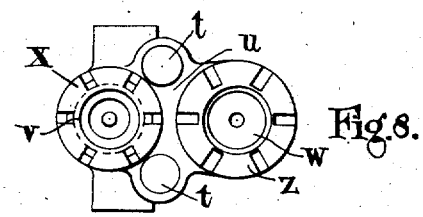
Witnesses.
Cornelius Zabriskie
M. C. Rodriguez
Inventor.
Harry V. R. Read.
By Griffin Burnbard
Attorneys.

UNITED STATES PATENT OFFICE.

HARRY VAUGHAN RUDSTON READ, OF LONDON, ENGLAND.

DEVICE FOR AERATING LIQUIDS.

1,056,451.     Specification of Letters Patent.     Patented Mar. 18, 1913.

Application filed July 1, 1912. Serial No. 706,842.

*To all whom it may concern:*

Be it known that I, HARRY VAUGHAN RUDSTON READ, a subject of the King of Great Britain and Ireland, and residing at Craig's Court, Charing Cross, London, W., England, have invented certain new and useful Devices for Aerating Liquids, of which the following is a specification.

The invention relates to improvements in devices for aerating liquids and particularly to improvements in devices in which by appropriate means the high pressure contents of a capsule suitably connected to a siphon, are discharged thereinto to aerate the contained liquid.

The main feature of the improved device according to the present invention is the means provided for holding stationary the charged capsule and discharging it by the movement of another element. By combining this feature, which so far as I am aware, is novel, with various others such as the positioning of the capsule point downward to insure a complete discharge as hereinafter described, I am enabled to provide an extremely compact device of the kind in question, applicable, though not restricted in such application, to an ordinary siphon with a removable head, in which with minimum care or attention on the part of the operator, complete discharge of the capsule is effected, while at the same time the different parts of the apparatus are correctly positioned automatically.

Figure 1:
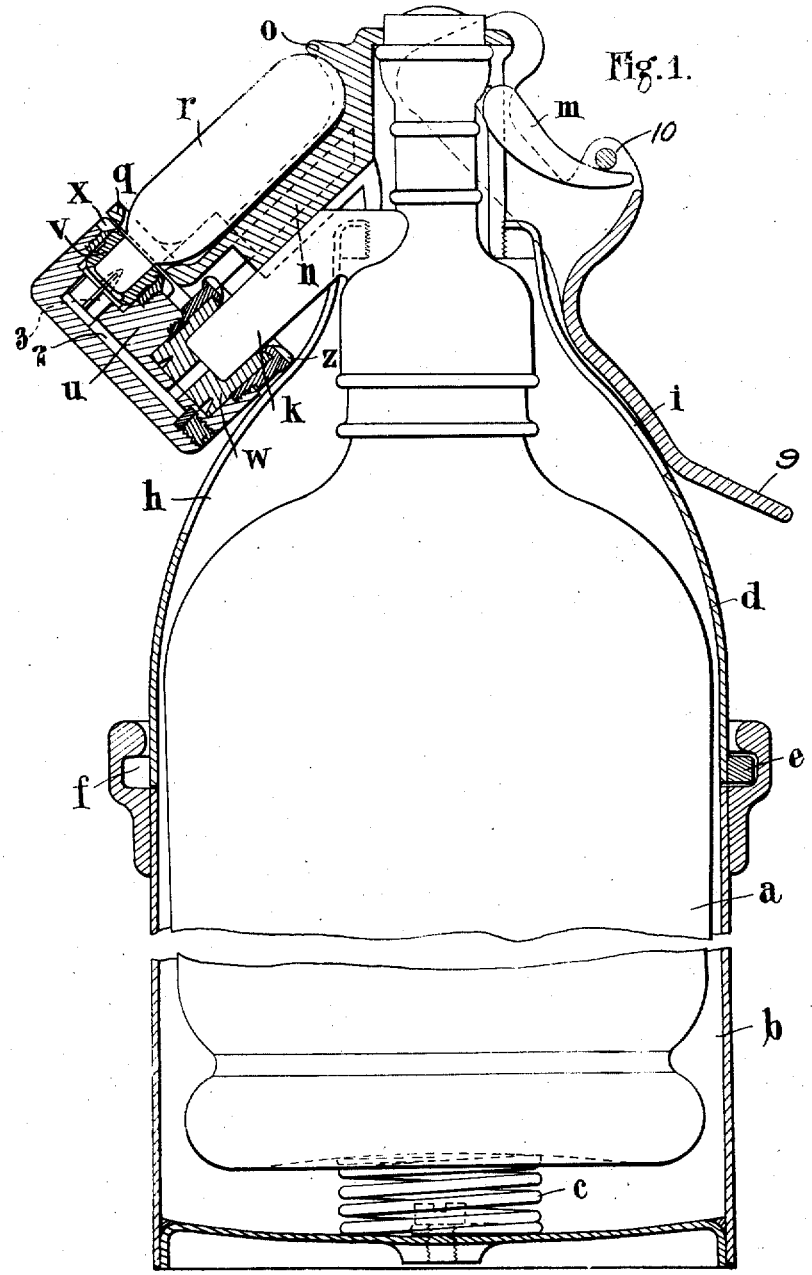
Figure 3:
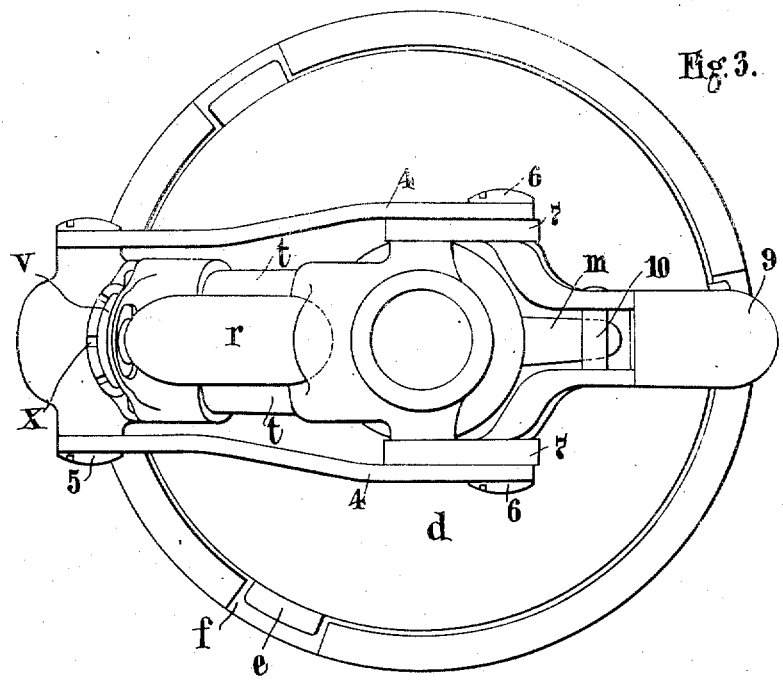
Figure 5:
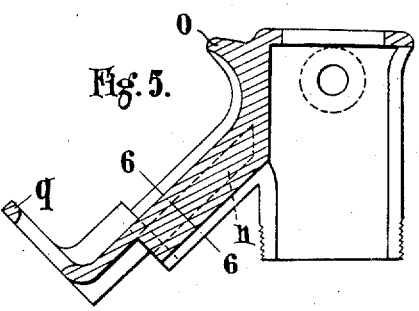
Figure 6:
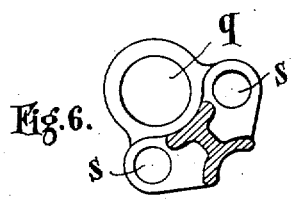

Referring to the accompanying drawings: Figure 1 shows the invention according to one form fitted to an ordinary siphon, many of the parts being in section; Fig. 2 shows a corresponding outside elevation with the parts in their operative position; Fig. 3 shows a plan; Fig. 4 shows a view similar to Fig. 2 before operation of the hand-lever; Fig. 5 shows a detail view in cross-section of the capsule holder. Fig. 6 being a section on the line 6—6 of Fig. 5, while Fig. 7 shows an elevation, and Fig. 8 a plan of the sliding block.

In carrying the invention into effect according to one form, as shown in the drawings, the siphon, $a$, in connection with which the invention is to be used, is inclosed in a specially constructed casing comprising a body, $b$, with bottom spring, $c$, and cover, $d$, the latter being detachably connected to the body by any suitable means, such as projections, $e$, coacting with a circular groove, $f$, and serving to form a species of bayonet joint. The cover is also provided with slots, $h$ and $i$, to allow the passage respectively of the spout or discharge member, $k$, and valve lever, $m$, of the siphon. The upper part of the cover, $d$, which acts as a base member for the support of the operating mechanism, fits neatly over the top of the siphon and is formed, as shown in Figs. 5 and 6, with a bracket or projection, $n$, running parallel to the siphon spout, and provided with a turned-over abutment portion, $o$, at the top, and an apertured portion, $q$, at the bottom for the reception of a capsule, $r$, while on each side a circular guide opening, $s$, is provided for the reception of the co-acting guide rods, $t$, (see Figs. 6, 7 and 8), attached to the sliding block, $u$. This connecting block is provided with two recesses in which appropriately shaped jointing rubber washers, $v$ and $w$, are inserted and held in position respectively by detachable caps, $x$ and $z$, so that the washers can be easily extracted for repair or renewal. These recesses are similarly disposed, *i. e.* they both face in the same direction and are spaced apart to correspond with the distance between the centers of the capsule, $r$, and spout, $k$, and are connected by a duct, 2, accessible by removal of a plug, cap or the like for cleaning purposes, formed in the body of the sliding block, while a pin, 3, is provided in the usual manner for the purpose of piercing the disk or opening the valve to discharge the capsule.

A pair of connecting links, 4, are pivoted at 5 at their lower ends to opposite sides of the sliding block, their upper ends being in turn pivoted at 6 to the short arms, 7, of a forked bell-crank lever pivoted to the upper part of the cover, $d$, at the point 8, the long arm of the bell-crank forming a hand-lever, 9, while a pin, 10, or projection carried thereby is provided for operation of the siphon valve lever.

Assuming the hand-lever in its raised position, as shown in Fig. 4, the capsule is inserted with it point downward and passing through the ring $q$, while its body portion rests on the inclined bracket or projection, $n$, attached to the cover, $d$. The hand-lever 9, is then thrown over with one continuous motion until in contact with the cover, as seen in Fig. 2, thereby moving the sliding block upward in a straight line determined by the co-action of the guide rods, $t$, and circular openings, $s$. The parts are so proportioned that the joints are made before the pin, 3, pierces the disk or opens the valve of the capsule, the siphon valve itself opening immediately afterward. The arrangement of the connecting links, 4, and hand-lever 9, forms, as is usual, in this class of device, a system of Stanhope levers by means of which a very large pressure is exerted when the center, 6, passes the line joining the centers, 5 and 8, while at the same time on raising the lever, 9, a comparatively large motion is available for closing the siphon valve lever before the sliding block releases the capsule and siphon spout joints.

In the apparatus of the present invention, the capsule is positioned in the holder with the discharge orifice pointing downwardly, as a result of which the liquid seals the outlet. Now upon breaking the seal, the liquid is expelled at the bottom part of the capsule by the pressure of the gas above the liquid, the discharge being almost instantaneous and expelling the whole of the liquid from the capsule, thereby avoiding the solidification of the liquid within the capsule and the consequent complete discharge of such liquid slowly from the capsule, which operations take place in capsules of prior aerating devices of which I have knowledge when such capsules are positioned with their discharge orifices facing upwardly.

It will be seen that with apparatus according to the form of the invention described no positioning of the parts is required by the operator, since the joint-making block is made once for all to suit the relative fixed positions of the centers of the capsule and siphon spout, and is guided by the means provided in a line parallel to the center lines of these parts. The apparatus can therefore be worked without liability of error, and with a minimum of attention on the part of the operator.

Although I have described in detail one particular form of the invention by way of example, it will be evident that the principles involved may be embodied in other constructional forms.

Having now described my invention what I claim as new and desire to secure by Letters Patent is:—

1. In apparatus for aerating liquids, a base member attachable to the liquid-containing receptacle to be charged, said member including means for holding a charged capsule stationary in relation thereto with its point downward; means for connecting said capsule with the discharge member of said receptacle; capsule-discharging means; together with means for operatively positioning said connecting means and actuating said capsule-discharging means.

2. In apparatus for aerating liquids, a base member attachable to the liquid-containing receptacle to be charged, said member including means for holding a charged capsule stationary in relation thereto; means for connecting said capsule with the discharge member of said receptacle, said capsule being retained in position to discharge its contents at the bottom thereof; means for constraining said connecting means to move in a definite path in relation to said base member; capsule-discharging means; together with means for operatively positioning said connecting means and actuating said capsule-discharging means.

3. In apparatus for aerating liquids, a base member attachable to the liquid-containing receptacle to be charged, said member including means for holding a charged capsule stationary in relation thereto and in a position to discharge the contents through the bottom of said capsule; means for connecting said capsule with the discharge member of said receptacle; means for constraining said connecting means to move in a definite path in relation to said base member; capsule-discharging means carried by said connecting means; together with means for operatively positioning said connecting means and actuating said capsule-discharging means carried thereby.

4. In apparatus for aerating liquids, a base member attachable to the liquid-containing receptacle to be charged, said member including means for holding a charged capsule stationary in relation thereto and in a position for said capsule to discharge its contents at the bottom thereof; means for connecting said capsule with the discharge member of said receptacle; capsule-discharging means; together with a single instrumentality for operatively positioning said connecting means and actuating said capsule-discharging means.

5. In apparatus for aerating liquids, a base member attachable to the liquid-containing receptacle to be charged, said member including means for holding a charged capsule stationary in relation thereto and in position to discharge the contents of the capsule at the bottom thereof; means for connecting said capsule with the discharge member of said receptacle; capsule-discharging means; together with a single instrumentality for operatively positioning said connecting means and actuating said capsule-discharging means, said instrumentality having a part adapted by continued movement of said instrumentality to contact with and operate the discharge valve lever of said receptacle.

6. In apparatus for aerating liquids, a base member attachable to the liquid-containing receptacle to be charged; means in slidable relation to said base member for connecting a charged capsule with the discharge member of said receptacle, said capsule being retained in position to discharge its contents at the bottom thereof, said connecting means being provided with similarly disposed jointing means to said capsule and discharge member respectively; capsule-discharging means; together with a single instrumentality for operatively positioning said connecting means and actuating said capsule-discharging means.

7. In apparatus for aerating liquids; a base member attachable to the liquid-containing receptacle to be charged; means slidable on said base member for connecting a charged capsule with the discharge member of said receptacle, said capsule being retained in position to discharge its contents at the bottom thereof; a bell-crank pivoted to said base member, one arm of said bell-crank forming a hand-lever, together with link means between the other arm of said bell-crank and said connecting means.

8. In apparatus for aerating liquids, a base member attachable to the liquid-containing receptacle to be charged; means slidable on said base member for connecting a charged capsule with the discharge member of said receptacle, said capsule being retained in position to discharge its contents at the bottom thereof; together with a Stanhope lever device pivoted to said base member and operatively linked to said connecting means.

9. In apparatus for aerating liquids, a base member attachable to the liquid-containing receptacle to be charged; means slidable on said base member for connecting a charged capsule with the discharge member of said receptacle, said capsule being retained in position to discharge its contents at the bottom thereof; a bell crank pivoted to said base member, one arm of said bell-crank forming a hand lever and having a part to contact with and operate the discharge valve lever of said receptacle with link means between the other arm of said bell-crank and said connecting means.

10. In apparatus for aerating liquids, a base member attachable to the liquid-containing receptacle to be charged, said member including means for supporting a charged capsule point downward with its axis parallel to that of the discharge member of said receptacle; means for connecting said charged capsule and said discharge member; together with means for operatively positioning said connecting means.

11. In apparatus for aerating liquids, a base member attachable to the liquid-containing receptacle to be charged; means for positioning a charged capsule to discharge its contents at the bottom thereof; means for connecting a charged capsule and the discharge member of said receptacle; said means being provided with jointing recesses therefor, the axes of which are parallel and spaced apart; together with means for operatively positioning said connecting means.

12. In apparatus for aerating liquids, a base member attachable to the liquid-containing receptacle to be charged, said member having a projection or bracket provided with an orifice at its lower end for the reception of the point of a charged capsule, said capsule being retained in position to discharge its contents at the bottom thereof, and an abutment at its upper end for the base of said capsule; means for connecting said capsule to the discharge member of said receptacle; together with means for operatively positioning said connecting means.

13. In apparatus for aerating liquids, a base member attachable to the liquid-containing receptacle to be charged, said member having an apertured portion for the support of the downwardly projecting point of a charged capsule; means disposed below said apertured portion for connecting said capsule to the discharge member of said receptacle together with means for moving said connecting means upwardly to operatively position the same and by a reverse movement downwardly to disengage said connecting means from said capsule supported by said apertured portion.

14. In apparatus for aerating liquids, a base member attachable to the liquid-containing receptacle to be charged, said base member having an apertured portion encircling the neck or point of a charged capsule; means for connecting said charged capsule and the discharge member of said receptacle; means for discharging said capsule at the bottom thereof; together with means for causing a relative movement of said connecting means and said apertured encircling portion to disengage said capsule after discharge.

15. In apparatus for aerating liquids, a base member attachable to the liquid-containing receptacle to be charged, said member including means for holding a charged capsule in position to discharge its contents at the bottom thereof, and operating, also, to retain said capsule in stationary relation to said base member; together with movable means for discharging the contents of said capsule into the interior of said receptacle.

16. In apparatus for aerating liquids, a base member attachable to the liquid-containing receptacle to be charged, said member including means for holding stationary in relation to said member a charged capsule with its point downward; together with movable means for discharging the contents of said capsule into the interior of said receptacle.

17. In apparatus for aerating liquids, a base member attachable to the liquid-containing receptacle to be charged, said member including means for holding a charged capsule stationary in relation to said member and in a position for said capsule to discharge its contents at the bottom thereof; capsule-discharging means and means for connecting said capsule with the interior of said receptacle; together with a single instrumentality for actuating said capsule-discharging means and operatively positioning said connecting means.

In testimony whereof I have signed my name to this specification in the presence of two subscribing witnesses.

HARRY VAUGHAN RUDSTON READ.

Witnesses:
GEORGE FREDERICK RUMPH,
FRANCIS RICHARD BETHELL.

---

Correction in Letters Patent No. 1,056,451.

It is hereby certified that Letters Patent No. 1,056,451, granted March 18, 1913, upon the application of Harry Vaughan Rudston Read, of London, England, for an improvement in "Devices for Aerating Liquids," were erroneously issued to the inventor, said Read, whereas said Letters Patent should have been issued to *Prana Carbonic Syphon Company, of New York, N. Y.*, as assignee, said corporation being owner of the entire interest in said invention as shown by the records of assignments in this office; and that the said Letters Patent should be read with this correction therein that the same may conform to the record of the case in the Patent Office.

Signed and sealed this 24th day of June, A. D., 1913.

[SEAL.]

C. C. BILLINGS,

*Acting Commissioner of Patents.* in relation to said member a charged capsule with its point downward; together with movable means for discharging the contents of said capsule into the interior of said receptacle.

17. In apparatus for aerating liquids, a base member attachable to the liquid-containing receptacle to be charged, said member including means for holding a charged capsule stationary in relation to said member and in a position for said capsule to discharge its contents at the bottom thereof; capsule-discharging means and means for connecting said capsule with the interior of said receptacle; together with a single instrumentality for actuating said capsule-discharging means and operatively positioning said connecting means.

In testimony whereof I have signed my name to this specification in the presence of two subscribing witnesses.

HARRY VAUGHAN RUDSTON READ.

Witnesses:
GEORGE FREDERICK RUMPH,
FRANCIS RICHARD BETHELL.

---

Correction in Letters Patent No. 1,056,451.

It is hereby certified that Letters Patent No. 1,056,451, granted March 18, 1913, upon the application of Harry Vaughan Rudston Read, of London, England, for an improvement in "Devices for Aerating Liquids," were erroneously issued to the inventor, said Read, whereas said Letters Patent should have been issued to *Prana Carbonic Syphon Company, of New York, N. Y.*, as assignee, said corporation being owner of the entire interest in said invention as shown by the records of assignments in this office; and that the said Letters Patent should be read with this correction therein that the same may conform to the record of the case in the Patent Office.

Signed and sealed this 24th day of June, A. D., 1913.

[SEAL.]

C. C. BILLINGS,

*Acting Commissioner of Patents.*

It is hereby certified that Letters Patent No. 1,056,451, granted March 18, 1913, upon the application of Harry Vaughan Rudston Read, of London, England, for an improvement in "Devices for Aerating Liquids," were erroneously issued to the inventor, said Read, whereas said Letters Patent should have been issued to *Prana Carbonic Syphon Company, of New York, N. Y.*, as assignee, said corporation being owner of the entire interest in said invention as shown by the records of assignments in this office; and that the said Letters Patent should be read with this correction therein that the same may conform to the record of the case in the Patent Office.

Signed and sealed this 24th day of June, A. D., 1913.

[SEAL.]

C. C. BILLINGS,

*Acting Commissioner of Patents.*